Patented Feb. 21, 1939

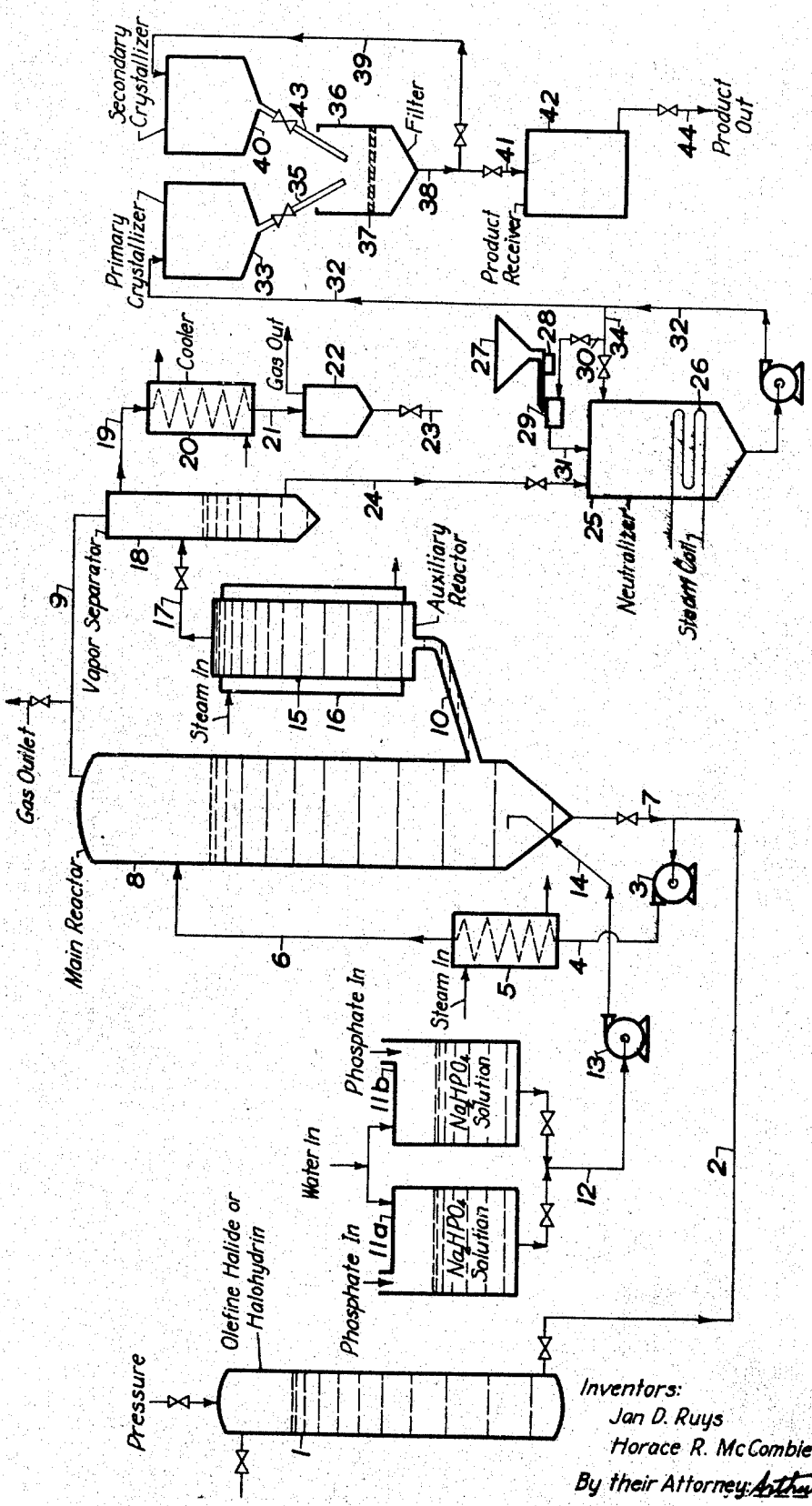

2,148,304

UNITED STATES PATENT OFFICE 2,148,304

TREATMENT OF HALOGENATED ORGANIC COMPOUNDS

Jan D. Ruys and Horace R. McCombie, Pittsburg, Calif., assignors to Shell Development Company, San Francisco, Calif., a corporation of Delaware Application January 10, 1938, Serial No. 184,288

20 Claims. (Cl. 260—636)

This invention relates to the treatment of halogenated organic compounds, and it provides a practical and economical process for the conversion of halogenated organic compounds, particularly halogenated compounds of the polyhalide and halohydrin types, to valuable compounds, particularly polyhydric alcohols and/or vinyl type halides. The process of the invention is particularly adapted to the economical and efficient production of glycols and other polyhydric alcohols.

Although the principles of the invention are, as will hereinafter be be more fully set forth, broadly applicable to the hydrolysis and/or dehalohydrination of halogenated organic compounds to result in hydroxy and/or other compounds, the invention will for the sake of convenience and clearness of understanding be illustrated and discussed in connection with its specific application to the production of glycols from the corresponding olefine dihalides, with particular reference to the hydrolysis of ethylene dichloride to ethylene glycol.

Many processes for effecting the hydrolysis of ethylene dihalides to ethylene glycol are known to the art. The great majority of the known processes comprise effecting the hydrolysis at an elevated temperature and pressure using strongly alkaline hydrolyzing agents. These processes are in general unsatisfactory for the technical scale production of glycol because of the difficulty and virtual impossibility of controlling the conditions so as to obtain a practicable yield of the desired glycol. The yields are reduced by the occurrence of side reactions resulting in the uncontrolled formation of vinyl compounds, resinous bodies and other undesirable by-products.

Attempts to produce glycol by effecting the hydrolysis of ethylene dichloride under weakly alkaline, neutral and acid conditions have also been made. The resulting processes are inherently unsatisfactory. Typical of the processes wherein the hydrolysis is effected using slightly basic reagents are those wherein the reaction is executed in the presence of an aqous solution of a metal carbonate and/or a metal bicarbonate. Such processes are costly and difficult to carry out, and they are also attended with difficulties occasioned by the high pressures under which they must be executed. During the hydrolysis reaction, carbon dioxide is generated and the pressure builds up in the system. Either the equipment must be adapted to withstand this progressively increasing pressure which beyond a certain point induces undesirable side reactions, or provisions must be made to valve off the gas from time to time and thereby maintain the desired pressure in the system. The valved-off gas carries some of the product from the system and necessitates elaborate recovery systems. The reaction originally starts with a high concentration of the alkali carbonate and/or bicarbonate and its resultant high pH value, and keeps diminishing as the reaction proceeds, thus resulting in a wide fluctuation of the pH value of the hydrolysis mixture, and the excessive occurrence of undesirable side reactions. We have found that satisfactory yields of glycol cannot be obtained with the alkali carbonate-bicarbonate processes unless they are executed under excessively high pressures, that is, at pressure greater than about 50 atmospheres and preferably in the range of from about 100 to 200 atmospheres. Unless such high pressures are employed, the reaction mixture is too basic, that is, its pH value is too high, and the excessive occurrence of undesirable side reactions which materially decrease the glycol yield cannot be avoided.

While some methods of hydrolyzing olefine dihalides under acid conditions in the absence of basic agents to neutralize the liberated hydrogen halide have been proposed, these processes are no better from the technical standpoint than those already discussed. The glycol yields of these processes is prohibitively low due to the occurrence of undesired side reactions. Whereas, the principal undesired by-products are vinyl halides and resinous products thereof when the hydrolysis is effected under alkaline conditions, conducting the hydrolysis under excessively acidic conditions results in the formation of prohibitively large amounts of aldehydic bodies, particularly acetaldehyde and resinous products thereof. In these processes, also, the pH of the reaction mixture varies over a wide range. Furthermore, the use of excessively acidic reaction mixtures introduces the problem of avoiding excessive corrosion of the reaction equipment, and requires frequent replacement of equipment or the use of prohibitively costly non-corrosive equipment.

A principal object of the present invention is to provide a practical and economical process adapted to the technical scale production of glycols and other polyhydric alcohols from halogenated organic compounds, particularly compounds of the olefine polyhalide, olefine halohydrin and glycerol halohydrin types.

Another object of the invention is to provide a practical and economical process adapted to the technical scale production of vinyl halides from the corresponding saturated polyhalides, particularly the olefine dihalides. An ethylene dihalide can be treated in accordance with the process of the invention under such conditions that the principal reaction which occurs comprises splitting of one molecule of a hydrogen halide from each molecule of the ethylene dihalide to result in practicable yields of the corresponding vinyl halide. When the process is executed under temperature, pressure and pH conditions which are optimum for glycol production, only insignificant amounts of vinyl halide are formed. However, by altering the reaction conditions, in particular by increasing the pH value of the reaction mixture, the reaction resulting in vinyl halide formation may be made to predominate or to take place almost exclusively. Thus, it is seen that the process may be executed to produce substantially only a glycol, to produce substantially only a vinyl halide, or to produce a glycol and a vinyl halide in such proportions as may be required for a particular purpose or to satisfy market conditions.

These and other objects of the invention are accomplished by the process of the invention which in its broad aspects comprises treating a hydrolyzable halogenated organic compound, such as an olefine dihalide, in the presence of water at an elevated temperature and preferably under a moderately elevated pressure, and in the absence of a neutralizing agent (such as a carbonate or bicarbonate) which reacts with a hydrogen halide to liberate an acidic gas, while accurately maintaining the pH value of the reaction mixture within definite and fixed limits. In the hydrolysis of halogenated organic compound, particularly compounds of the olefine dihalide and halohydrin types, we have found that accurate control of the pH value of the reaction mixture within certain definite predetermined limits is of the greatest importance if undesirable side reactions are to be obviated and high yields of the desired polyhydric alcohols obtained.

The optimum pH value to be maintained in the reaction mixture in each particular case will depend upon the particular halogenated compound treated and to a certain extent upon the temperature at which the hydrolysis is effected. In the great majority of cases, when a hydroxy-compound is to be produced, we prefer to effect the hydrolysis under moderately acidic conditions and maintain the pH value of the reaction mixture below 7 but not less than about 1. For each particular material treated and each particular set of hydrolyzing conditions, the optimum pH value to be used can be readily and easily determined by experimental means within the knowledge of those skilled in the art. When ethylene dichloride is hydrolyzed to ethylene glycol in accordance with the process of the invention at temperatures of from about 140° C. to 250° C. and pressures preferably not much greater than about 40 atmospheres, the best results are obtained when the pH value of the reaction mixture is within the range of from about 1 to 6, and preferably in the range of from about 2 to about 5. By operating within this preferred range (pH=2 to 5) and particularly when operating with a pH range of from 2 to 4, ethylene dichloride has been hydrolyzed to ethylene glycol with the substantial obviation of undesirable side reactions and the attainment of glycol yields of 90% and higher. When the pH of the reaction mixture is much higher than about 6, the glycol yield is materially decreased due to the conversion of a considerable quantity of the treated olefine dihalide to a vinyl halide. When the pH value of the reaction mixture is much less than about 2, the yield is decreased due to the formation of carbonylic compounds, particularly acetaldehyde.

It is seen from the above that when it is desired to execute the invention to obtain a practical conversion of the treated olefine dihalide to the corresponding vinyl halide, the pH value of the reaction mixture is maintained greater than about 6 and preferably greater than 7. By accurately controlling the pH of the reaction mixture between about 6 to about 12, almost any desired conversion to the vinyl halide can be obtained. We have, for example, by operating at a temperature of about 166° C. under a pressure of about 15 atmospheres and while maintaining a pH value of about 8.8 in the aqueous reaction mixture, obtained about a 70% conversion of ethylene dichloride to vinyl chloride while at the same time obtaining glycol in a yield of about 10%.

In accordance with the invention, the pH value of the aqueous reaction mixture is easily and accurately controlled by providing a hydrolyzing solution having the desired pH value and containing a compound which will act as a buffer and keep the hydrolyzing solution at approximately the desired pH value during the hydrolysis, and contacting the so buffered hydrolyzing solution with the desired quantity of the material to be hydrolyzed under requisite conditions of temperature and pressure. In this manner, by selecting the buffer compound having the requisite characteristics, and by regulating the flow of the hydrolyzing solution into the reactor wherein it is intimately contacted with the material to be treated under the desired temperature and pressure conditions, the hydrogen ion concentration (pH) of the reaction mixture is easily and accurately controlled within the desired range.

A variety of buffer substances may be used in the execution of the invention. It is, however, apparent from what has been said previously that the hydrolyzing solution should not contain any compound (such as a carbonate or bicarbonate) which will react with the hydrogen halide liberated during the hydrolysis reaction to form a material which is gaseous under the conditions of operation and will unduly increase the pressure in the reactor. Thus, it is seen that the carbonates and bicarbonates are unsuitable buffer compounds. Among the common compounds which are readily available, inexpensive and suitable for use as buffers are the alkaline phosphates, particularly the alkali metal phosphates, such as monosodium phosphate, disodium phosphate, trisodium phosphate, dipotassium phosphate, and the like, the ammonium phosphates such as monoammonium phosphate, diammonium phosphate, triammonium phosphate, and the alkaline borates which have the requisite buffering and solubility characteristics. For example, when trisodium phosphate is used it will consume the hydrogen halide produced by the hydrolysis with formation of disodium phosphate, monosodium phosphate and perhaps phosphoric acid. The particular mixture of phosphates and the pH of the reaction mixture will depend upon the amount of trisodium phosphate added relative to the amount of the halogenated organic compound hydrolyzed, and any desired pH may be maintained in the reaction mixture by varying the amounts of the reactants added.

A particularly suitable and preferably employed buffering compound, which may be employed in solution with some other suitable alkaline hydrolyzing agent, or which may be employed per se as the hydrolyzing agent, is disodium phosphate ($Na_2HPO_4$) or some other compound which has the same or similar desirable pH value and solubility characteristics which will hereinafter be described.

For purposes of convenience, the invention will be described with particular reference to the specific embodiment thereof which comprises the use of disodium phosphate as the agent to maintain the reaction mixture at the desired pH value in the hydrolysis of ethylene dichloride to ethylene glycol. The hydrolysis reaction may be expressed by the following equations:

(1) $CH_2Cl-CH_2Cl + 2Na_2HPO_4 + 2H_2O \rightarrow CH_2OH-CH_2OH + 2NaH_2PO_4 + 2NaCl$ (2) $CH_2Cl-CH_2Cl + Na_2HPO_4 + 2H_2O \rightarrow CH_2OH-CH_2OH + H_3PO_4 + 2NaCl$ By reacting the ethylene dichloride with controlled amounts of the disodium phosphate solution, either reaction (1) or reaction (2) can be made to occur predominantly. This is done by determining the pH value of the reaction mixture subsequent to the reaction and adjusting the amounts of the disodium phosphate solution and ethylene dichloride charged into the reaction vessel so that the desired pH value is maintained in the reaction mixture. When the flows of the reactants are so adjusted that the pH of the reaction mixture is maintained in the range of from about 2 to about 5, both reactions occur with reaction (1) predominating to the extent that the phosphate in the reacted mixture is about 90% $NaH_2PO_4$, the remainder being $H_3PO_4$. The ease with which reactions (1) and (2) and the pH value of the reaction mixture can be controlled as above described is made clear by a consideration of the pH value of $H_3PO_4$, $NaH_2PO_4$, $Na_2HPO_4$ and $Na_3PO_4$ solutions and solutions containing various mixtures of these compounds. The determinations listed in the following table were made at a temperature of about 33° C.

*Hydrogen ion concentrations of sodium phosphate solutions*

| Compounds present proportion—mols | Mols Na+ | C. C. 1 O M $H_3PO_4$ | C. C. 1 O M $Na_3PO_4$ | pH |
|---|---|---|---|---|
| $H_3PO_4$ | 0.00 | 120 | 0 | 0.9 |
| $3H_3PO_4 + NaH_2PO_4$ | 0.25 | 110 | 10 | 1.2 |
| $H_3PO_4 + NaH_2PO_4$ | 0.50 | 100 | 20 | 1.8 |
| $H_3PO_4 + 3NaH_2PO_4$ | 0.75 | 90 | 30 | 2.4 |
| $H_3PO_4 + 7NaH_2PO_4$ | 0.875 | 85 | 35 | 2.9 |
| $NaH_2PO_4$ | 1.00 | 80 | 40 | 4.5 |
| $7NaH_2PO_4 + Na_2HPO_4$ | 1.125 | 75 | 45 | 5.4 |
| $3NaH_2PO_4 + Na_2HPO_4$ | 1.25 | 70 | 50 | 5.9 |
| $NaH_2PO_4 + Na_2HPO_4$ | 1.50 | 60 | 60 | 6.5 |
| $NaH_2PO_4 + 3Na_2HPO_4$ | 1.75 | 50 | 70 | 7.2 |
| $NaH_2PO_4 + 7Na_2HPO_4$ | 1.875 | 45 | 75 | 7.7 |
| $Na_2HPO_4$ | 2.00 | 40 | 80 | 9.5 |
| $7Na_2HPO_4 + Na_3PO_4$ | 2.125 | 35 | 85 | 10.3 |
| $3Na_2HPO_4 + Na_3PO_4$ | 2.25 | 30 | 90 | 10.7 |
| $Na_2HPO_4 + Na_3PO_4$ | 2.50 | 20 | 100 | 11.2 |
| $Na_2HPO_4 + 3Na_3PO_4$ | 2.75 | 10 | 110 | 11.7 |
| $Na_3PO_4$ | 3.00 | 0 | 120 | 12.7 |

It is seen from the data of the above table that the pH of the reaction mixture can, in accordance with the invention, be accurately controlled and maintained within the range desired by regulating the rate at which the $Na_2HPO_4$ solution is added to the reaction mixture relative to the rate of hydrolysis of the ethylene dichloride. The reaction liberates hydrochloric acid which reacts with the $Na_2HPO_4$ to convert it to $NaH_2PO_4$ and $H_3PO_4$. The process may be operated so that $Na_2HPO_4$ or $NaH_2PO_4$ are regenerated during the reaction, or the reacted mixture may subsequently be treated to convert the $NaH_2PO_4$ and $H_3PO_4$ to $Na_2HPO_4$, and the latter recovered therefrom for reutilization.

In the first of the above-mentioned modes of operation, the hydrolysis reaction may be effected in the presence of such an amount of $Na_2HPO_4$ that the desired pH is maintained in the reaction mixture by adding a basic agent intermittently or continuously to regenerate the $Na_2HPO_4$. Thus, the phosphates act in a buffer capacity. The mechanism of this particular alternative mode of operation is best seen by reference to the reactions which occur. The hydrolysis reaction may be considered to take place in accordance with the equation:

$CH_2Cl-CH_2Cl + 2H_2O \rightarrow CH_2OH-CH_2OH + 2HCl$

Any disodium phosphate present in the reaction mixture will react with the liberated hydrochloric acid to form monosodium phosphate and/or phosphoric acid in accordance with the equations:

$Na_2HPO_4 + HCl \rightarrow NaH_2PO_4 + NaCl$
$Na_2HPO_4 + 2HCl \rightarrow H_3PO_4 + 2NaCl$ The addition to the reaction mixture of sodium hydroxide, sodium carbonate, sodium bicarbonate or any other suitable basic sodium salt or compound will reverse these reactions resulting in the regeneration of the disodium phosphate or monosodium phosphate in accordance with the equations:

$NaH_2PO_4 + NaOH \rightarrow Na_2HPO_4 + H_2O$
$H_3PO_4 + NaOH \rightarrow NaH_2PO_4 + H_2O$
$H_3PO_4 + 2NaOH \rightarrow Na_2HPO_4 + 2H_2O$ The pH of the reaction mixture can be maintained within the desired range by regulating the rate of addition of the NaOH relative to the rate of hydrolysis of the ethylene dichloride whereby the desired concentration of the disodium phosphate or monosodium phosphate are maintained in the reaction mixture. The overall reaction may then be expressed by the equation:

$CH_2Cl-CH_2Cl + 2NaOH \xrightarrow{Na_2HPO_4} CH_2OH-CH_2OH + 2NaCl$

It is to be understood that the above-described mode of operation is not limited to the use of disodium phosphate and sodium hydroxide. Other known buffer compounds, and basic compounds which will regenerate them in accordance with the mechanism described to maintain the desired pH in the reaction mixture, preferably without liberation of a gaseous neutralization product, such as $CO_2$, may be used.

In an alternative and preferred mode of operation, particularly when it is desired to operate continuously on a technical scale, disodium phosphate in aqueous solution is used as the hydrolyzing agent. When disodium phosphate alone is used as the hydrolyzing agent, it is generally used in relatively larger amount than when it is employed solely as a buffer in conjunction with some other basic hydrolyzing agent. In this modification of the process, it is unnecessary to supply a basic agent to the reaction mixture to regenerate the disodium phosphate. The disodium phosphate is regenerated and recovered, when such recovery is desired, by treating the hydrolysis solution after it has left the reactor. Since a relatively larger amount of the disodium phosphate is present than when the disodium phosphate is used merely as a buffer, and since no caustic is added during the hydrolysis, the pH of the reaction mixture changes slowly and but little with slight variations in the rate of addition of the phosphate solution and the material to be hydrolyzed to the reaction mixture. The pH value of the reaction mixture is easily controlled within the desired limits by regulating the relative rates of flow of the disodium phosphate solution and the material to be hydrolyzed into the reactor.

Disodium phosphate is, primarily because of its favorable pH value characteristics and solubility characteristics, particularly suitable as a hydrolyzing agent or buffer in the execution of our invention. By its use in aqueous solution in the manner herein described, the pH range of from 2 to 5, which we have found particularly suitable for the hydrolysis of ethylene dichloride to glycol, is easily maintained in the reaction mixture. Disodium phosphate has a steep solubility curve, that is, there is a great change in solubility to the salt in water with change in temperature. These solubility characteristics make it a simple matter to recover the regenerated disodium phosphate from the hydrolysis solution after the hydrolysis has been effected. At 0° C., the solubility of anhydrous $Na_2HPO_4$ in water is only about 0.1 mol per 1000 gm. of water, while at 35° C. this solubility has increased to 3.0 mols per 1000 gm. of water. Furthermore, when the $Na_2HPO_4$ crystallizes it removes water from the solution and increases the glycol water ratio therein, since the disodium phosphate crystallizes out as $Na_2HPO_4.12H_2O$. Thus, starting with an aqueous disodium phosphate solution containing 3 mols of $Na_2HPO_4$ per 1000 gm. of water at 35° C. and cooling to 0° C., approximately 2.9 mols of $Na_2HPO_4.12H_2O$ would crystallize out leaving only 374 gm. of water containing 0.04 mol. of $Na_2HPO_4$. Thus assuming all of the phosphate to be present as $Na_2HPO_4$, the recovery of the disodium phosphate would be 99%, and the glycol-water ratio of the remaining solution would be increased 2.7 times. The increase in glycol-water ratio makes for a material reduction in cost of concentrating the glycol. Instead of removing all of the water by distillation, for example, a part of it is removed as water of crystallization. In practice, the solution from which the $Na_2HPO_4$ is recovered also contains a polyhydric alcohol, such as glycol, and a salt, such as NaCl. We have found that all of the desirable solubility characteristics of $Na_2HPO_4$ are retained in the presence of glycol and NaCl, permitting the practically complete crystallization of the $Na_2HPO_4$ therefrom. The presence of NaCl decreases the solubility of $Na_2HPO_4$ in water at 0° C.

The process of the invention may be executed in a variety of suitable types of apparatus, depending mainly upon whether operation in a batch, intermittent or continuous manner is desired. In a continuous mode of operation employing an aqueous solution of $Na_2HPO_4$ as the hydrolysis solution, the reaction may be effected conveniently in an autoclave of the circulatory type. The reaction mixture, at the desired temperature and pressure, may be circulated through the reactor while the material to be converted, and the disodium phosphate solution of the desired concentration, are added to the circulating reaction mixture, preferably continuously, at the desired rate, which rate will depend upon several factors such as the pH which it is desired to maintain in the reaction mixture, the residence time, etc.

The disodium phosphate solution introduced into the reaction mixture may be of any suitable concentration. In the majority of cases, a 1M disodium phosphate solution, which is a saturated solution and contains about 142 gm. of $Na_2HPO_4$ per liter at a temperature slightly above room temperature, is conveniently employed. If solutions of greater concentration are desired, they may be prepared at an elevated temperature and introduced into the reactor while at a temperature sufficiently high to keep the $Na_2HPO_4$ in solution. Solution of lower concentration may be used when desired, but the product will be more dilute.

The process may be operated over a wide range of temperatures. The optimum temperature to be employed in any given case will depend upon a variety of factors such as the particular halogenated compound treated, the pH maintained in the reaction mixture, the contact time of the reactants in the reaction system, the pressure under which it is desired to operate, etc. In general, the process may be executed at temperatures in the range of from about 125° C. to about 250° C. The hydrolysis of ethylene dichloride to ethylene glycol, and the conversion of ethylene dichloride to vinyl chloride may be conveniently effected at temperatures of from 140° C. to about 250° C., a temperature of about 185° C. to 220° C. giving excellent yields.

The process is preferably executed under a moderately elevated pressure, although it may in some cases be feasible to operate at about atmospheric pressure depending upon the temperature at which the process is executed. Pressures of form about 5 atmospheres to about 30 atmospheres are generally suitable, although higher or lower pressures may be used when necessary or desirable. In the hydrolysis of ethylene dichloride to ethylene glycol, excellent results have been obtained by operating under pressures of from about 10 to 25 atmospheres at temperatures of from about 175° C. to 220° C., and for practical purposes it does not appear necessary to use pressures much greater than 25 atmospheres.

The residence time of the reaction mixture in the reactor will depend upon the other conditions of operation and upon the particular halogenated material treated and the degree of conversion desired. While the reaction mixture is in the reactor, it is desirable that there be intimate contact between the reactants and that there be a minimum fluctuation in pH of the mixture. After the reaction mixture has been in the reactor for the required length of time under the existing reaction conditions, it is discharged therefrom and the product and disodium phosphate recovered. In a continuous mode of operation, the reaction mixture may be continuously discharged from the continuous reactor and conveyed to the recovery stage or stages of the system.

The recovery operations will be described with particular reference to the recovery of the disodium phosphate and glycol from the solution discharged from the reactor wherein ethylene dichloride has been substantially completely hydrolyzed to ethylene glycol while maintaining the pH of the reaction mixture at about 3, it being understood that this is merely illustrative and that the same principles, with modifications apparent to those skilled in the art, apply for any use to which the process of the invention is put. The solution discharged from the reaction vessel contains NaCl, glycol and phosphate in the form of $NaH_2PO_4$ and $H_3PO_4$. In a typical case, this product solution will have a pH of about 3 and the phosphate in the solution will consist of about 90% $NaH_2PO_4$ and about 10% $H_3PO_4$. In order to restore the $NaH_2PO_4$ and the $H_3PO_4$ in the solution to $Na_2HPO_4$, the solution must be treated with an alkaline sodium compound, such as NaOH, $Na_2O$, $Na_2CO_3$, etc., and neutralized to the pH value that the solution would have if all of the phosphate were present as $Na_2HPO_4$. Sodium hydroxide and sodium carbonate are suitable agents for this purpose, the use of the latter being in some cases more economical. The mechanism of the neutralization when $Na_2CO_3$ is used as the neutralizing agent and the neutralization is effected at the preferred temperature of about 100° C. may be represented by the overall equations:

$$2NaH_2PO_4 + Na_2CO_3 \rightarrow 2Na_2HPO_4 + CO_2 + H_2O$$
$$H_3PO_4 + Na_2CO_3 \rightarrow Na_2HPO_4 + CO_2 + H_2O$$

At the temperature at which the neutralization is effected (about 100° C. or higher), the $CO_2$ is evolved and the formed $Na_2HPO_4$ is in solution. The $Na_2HPO_4$ is recovered from the solution by cooling it to a temperature of about 0° C., whereby the disodium phosphate crystallizes out as $Na_2HPO_4.12H_2O$. By operating in this manner, practically all of the $Na_2HPO_4$ is recovered by simple filtration or centrifugation, and the glycol-water ratio of the product solution is raised. The recovered $Na_2HPO_4.12H_2O$ may be reutilized in the hydrolysis or dehalohydrination step of the process.

Subsequent to the phosphate recovery step, the glycol or other polyhydric alcohol may be recovered from the filtrate containing water and salt in a variety of suitable manners. For example, any of the known evaporation, distillation, extraction and the like methods such as are used for recovering glycols and glycerol from salt solutions may be applied. In general, vacuum distillation and flash distillation methods of recovery are quite suitable.

In the accompanying drawing, we have shown, diagrammatically, an arrangement of apparatus suitable for use in the continuous conversion of halogenated organic compounds, particularly olefine halides and olefine halohydrins, to the corresponding hydrolysis products using disodium phosphate as the agent to maintain the pH of the reaction mixture substantially constant within the desired operating range.

Referring to the drawing, reference figure 1 designates a supply tank for the halogenated organic compound to be hydrolyzed. This container may be of any convenient material, type and capacity; it is represented on the drawing as a conventional blow-case equipped with means for charging the material to be treated thereto, and means for applying pressure (such as nitrogen or some other inert gas) to force the material therefrom at the desired rate and under the desired pressure. The material leaves container 1 through conduit 2, is discharged into the suction side of circulating pump 3, and is, along with the circulating reaction mixture which leaves main reactor 8 through conduit 15 and is also fed into the suction side of pump 3, passed through heater 5 and into reactor 8 through conduit 6.

Reactor 8, which may be of any suitable material, type and capacity, is represented on the drawing as of the circulatory type. The reaction mixture is circulated through the circuit comprising the main reactor 8, outlet conduit 7 at or near the base of the reactor, circulating pump 3 which may be of any suitable type and capacity, heater 8 wherein heat is transferred to the circulating liquid by any convenient indirect heat transferring means, such as by use of steam heated coils, and the circulating liquid maintained within the desired reaction temperature range, and conduit 6 which communicates with the upper portion of reactor 8 and completes the circuit. The upper portion of reactor 8 may be provided with refluxing means. The reactor as illustrated is in communication by means of gas line 9 with the upper portion of separator 18. Since gaseous by-products, in particular vinyl halides, may be formed during the reaction, gas line 9 may be equipped with means for releasing any such gaseous material from the system.

The disodium phosphate solution is added to the circulating reaction mixture in the desired amount and at the desired rate through conduit 14 into the lower portion of column 8. The hydrolyzing solution is made up in tanks 11a and 11b, into which water and the disodium phosphate or sodium hydroxide and phosphoric acid may be introduced in the required amount. More than two or even a single phosphate solution tank may, if desired, be employed. The use of two such tanks connected as illustrated is merely a matter of convenience. The solution of the desired concentration may be continuously withdrawn from one tank and discharged, at the requisite rate, into the reactor while another batch of such solution is being made up in the other tank which is temporarily out of communication with the reactor. It is in some cases desirable that the hydrolyzing solution tanks be provided with heating means adapted to maintain the solution therein at an elevated temperature. This may be necessary when it is desired that the solution contain a greater concentration of disodium phosphate than can be dissolved in water at about room temperature. The hydrolyzing solution is withdrawn from tanks 11a and/or 11b through conduit 12 by means of pump 13 and discharged at a controlled rate through conduit 14 into reactor 8.

The reaction mixture is continuously withdrawn at the desired rate from reactor 8 through conduit 10 into auxiliary reactor 15. The use of the auxiliary reactor 15 is optional. Its use is to insure complete reaction of any unreacted halogenated material which may be present in the reacted mixture leaving the circulatory system of the main reaction. In most cases, the conditions of operation and rate of withdrawal are such that the reaction is conducted to substantial completion in the circuit comprising the main reactor 8. The desired reaction temperature is maintained in the auxiliary reactor by suitable heating means, for example, by means of steam passed through jacket 16. The temperature in the auxiliary reactor may be the same or different than the temperature in the main reactor, as desired. If desired, means (not shown) may be provided for introducing at least a part of the hydrolyzing solution into the auxiliary reactor in controlled amount. In this manner, the pH of the circulating reaction mixture in the reaction system can be accurately controlled regardless of the amount of reaction taking place in the auxiliary reactor, thus avoiding too low a pH and excessive corrosion and occurrence of side reactions in the auxiliary reactor.

From the upper part of auxiliary reactor 15, which is kept full of the reaction mixture by pressure on the liquid in reactor 8, the reaction mixture is discharged, at the desired rate and preferably continuously, by means of conduit 17, which is equipped with a suitable expansion valve, into separator 18. Vapor separator 18 may be of any suitable material, design and capacity; its function is obvious. The upper portion of separator 18 is provided with a vapor line 19 through which the hot vapors are passed into cooler 20 (which is cooled by water or any other suitable cooling agent). Any liquid condensed in cooler 20 flows through conduit 21 into container 22 from which it may be discharged intermittently or continuously and treated to recover any of the reaction product and/or unreacted dihalide or halohydrin contained therein. In the conversion of ethylene dichloride to glycol with the mixture in the reactor at a temperature of from about 170° C. to 190° C. and under a pressure of from about 15 to 20 atmospheres, the reaction mixture, on passage through the expansion into the separator at about atmospheric pressure, boiled whereby its temperature was decreased to about 102° C. The vapors passed through conduit 19 and into cooler 8, about 8% depending upon the temperature, of the volume of the solution entering separator 18 being collected as condensate in container 22. Any unreacted ethylene dichloride was collected in this condensate.

The liquid reacted mixture is discharged from separator 18, through conduit 24, into neutralizer 25. In neutralizer 25, which may be of any suitable material, type and capacity, the liquid from separator 18 is treated with a suitable basic sodium compound such as sodium carbonate or sodium hydroxide, to convert the $NaH_2PO_4$ and/or $H_3PO_4$ in the product solution to $Na_2HPO_4$. The neutralizer is preferably equipped with suitable agitating means (not shown) and suitable heating means, such as the steam coil shown (26), so that the neutralization may, if desired, be effected at an elevated temperature. In accordance with a suitable mode of operation, the neutralization is effected with $Na_2CO_3$, in which case the temperature, during the neutralization, is maintained at about 90° C. to about 110° C. to insure decomposition or any bicarbonate formed and to keep the formed $Na_2HPO_4$ in solution. To avoid unnecessary dilution of the product, the neutralizing agent is preferably added as a solid or in concentrated aqueous solution. The drawing shows means suitable for adding the solid neutralizing agent continuously at the requisite rate. The solid neutralizing agent is placed in hopper 27, the bottom of which is provided with a magnetic vibrator exit 28 by means of which the solid agent is admitted at the desired rate into small feed tank 29, from which it is washed, by means of circulating liquid from conduit 30, through conduit 31, into neutralizer 25. The neutralized liquid is pumped from the lower portion of neutralizer 25, through conduit 32, into primary crystallizer 33. To afford agitation in the neutralizer 25, a portion of the neutralized liquid from conduit 32 may be recirculated through the neutralizer by means of conduit 34, which is in communication with the upper portion of neutralizer 25 and conduit 30.

Primary crystallizer 33, which may be of any suitable material, type and capacity, is preferably operated at about room temperature. When the hot neutralized solution from the neutralizer enters crystallizer 33, it is cooled to about room temperature whereupon a part of the dissolved $Na_2HPO_4$ crystallizes out as the hydrate $Na_2HPO_4.12H_2O$). The slurry from crystallizer 33 is conducted, through conduit 35, into filter 36, which filter may be of any suitable type and as a vacuum filter provided with a suitable plate, cloth or screen (37). Suitable means (not shown) may be provided for cooling the material in crystallizer 33. The filtrate is discharged from the filter through conduit 38 which is in communication with secondary crystallizer 40 through valved conduit 39, and with product receiver 42 through valved conduit 41.

In secondary crystallizer 40, the filtrate of the material subjected to partial crystallization in primary crystallizer 33, is subjected to final crystallization at about 0° C., whereby substantially the remainder of the dissolved $Na_2HPO_4$ crystallizes out as the hydrate ($Na_2HPO_4.12H_2O$). The material in crystallizer 40 is kept at the desired low temperature by the use of suitable cooling means (not shown). For example, crystallizer 40 may be provided with a suitable external jacket or inside coils through which a cooling medium, such as a glycol solution or brine is circulated, the cooling medium being cooled, for example, by passage through a liquid ammonia refrigerating system. When the filtrate from the material in crystallizer 33 is being conducted to crystallizer 40, the valve in conduit 41 is kept closed. The slurry obtained by crystallization of the $Na_2HPO_4.12H_2O$ in crystallizer 40 is passed, through conduit 43 (while the valve in slurry conduit 35 and the valve in conduit 39 are closed), into filter 36. The filtrate is passed by means of communicating conduits 38 and 41 into product storage tank or receiver 42. From tank 42, the aqueous solution of the product and salt, which may also contain some polyglycol, may be conducted to one or more recovery stages for recovery of the product in any purity desired. The $Na_2HPO_4$ may be removed from filter 36 and conveyed to solution tanks 11a and/or 11b.

Conventional valve-systems, pumps, heaters, coolers, pressure gages, temperature indicators, draw-off cocks, etc., may be installed in the above-described system wherever deemed necessary or desirable.

The following are examples of some of the operations of the process conducted in a system such as that or similar to that above-described. The examples are to be regarded as illustrative only.

Example I

Ethylene dichloride was hydrolyzed to ethylene glycol using $Na_2HPO_4$ in aqueous solution as the hydrolyzing agent. The operation was continuous.

| | |
|---|---|
| Total ethylene dichloride added to system_____c. c__ | 7,425 |
| Total ethylene dichloride recovered c. c__ | 5 |
| Total ethylene dichloride consumed c. c./hour__ | 136 |
| Concentration of $Na_2HPO_4$ solution mols/liter__ | 1.06 |
| Amount of $Na_2HPO_4$ solution used liters/hour__ | 3.22 |
| Duration of run_____hours__ | 54.75 |
| Reaction temperature_____degrees C__ | 192 |
| Pressure in reactor_____atmospheres__ | 13.7 |
| pH of reaction mixture_____ | 3.8 |
| Yield of ethylene glycol_____per cent__ | 83.5 |
| Yield of vinyl chloride_____per cent__ | 0.2 |

Example II

This example shows illustrative data on the recovery and reutilization of the $Na_2HPO_4$ used to effect the hydrolysis of ethylene dichloride to ethylene glycol. The solution discharged from the reactor was neutralized with solid $Na_2CO_3$ to convert dissolved phosphates to $Na_2HPO_4$.

| | |
|---|---:|
| Pressure in reactor_____atmospheres__ | 19.4 |
| pH of reaction mixture_____ | 2.9 |
| Reaction temperature_____degrees C__ | 190 |
| Operating time_____hours__ | 20 |
| Total ethylene dichloride added to system_____kilos__ | 48.8 |
| Total ethylene dichloride recovered kilos__ | 0.8 |
| Total ethylene dichloride consumed kilos/hour__ | 2.44 |
| Concentration of $Na_2HPO_4$__mols/liter__ | 1.10 |
| Amount of $Na_2HPO_4$ solution used liters/hour__ | 39.6 |
| pH of product solution entering neutralizer_____ | 2.6 |
| Temperature in neutralizer___degrees C___ | 92 |
| Amount of $Na_2CO_3$ consumed in neutralizer_____kilos/hour__ | 2.23 |
| Mols $Na_2CO_3$ added per mols $CH_2Cl—CH_2Cl$ consumed_____ | 0.96 |
| Mols $Na_2CO_3$ loss per mol $CH_2Cl—CH_2Cl$ consumed__ | 0.054 |
| pH of neutralized $Na_2HPO_4$ solution_____ | 7.7 |
| Temperature in primary crystallizer degrees C__ | 20 |
| Temperature in secondary crystallizer degrees C__ | 5 |
| Mols $Na_2HPO_4$ for hydrolysis per mol $CH_2Cl—CH_2Cl$ consumed_____ | 1.67 |
| pH of glycol-salt solution_____ | 7.4 |
| Yield of ethylene glycol_____per cent__ | 78.9 |
| Yield of vinyl chloride_____per cent__ | 0.1 |

*Example III*

The data in the following table illustrate the process as applied to the conversion of ethylene dichloride to vinyl chloride and ethylene glycol, and show the influence of the pH of the reaction mixture on the relative yields of glycol and vinyl chloride. The hydrolyzing solution contained 0.40 mol. of trisodium phosphate and about 9.6 mols of sodium hydroxide in about 4,640 c. c. of solution. The operations were conducted batchwise in an autoclave equipped with suitable heating and cooling means. The ethylene dichloride was added at the rate of about 120 to 130 c. c./hour. The hydrolyzing solution was introduced into the autoclave at such a relative rate that the desired pH was maintained substantially constant. The trisodium phosphate ($Na_3PO_4$) functioned as a buffer, supplying phosphate salts to buffer sudden changes in pH. The pH values were determined at about room temperature.

| Run No. | 1 | 2 | 3 | 4 | 5 | 6 | 7 | 8 |
|---|---|---|---|---|---|---|---|---|
| Duration of run (hours) | 3 | 5 | 6 | 6 | 6 | 6.5 | 6 | 5 |
| Temperature, °C | 165 | 166 | 165 | 165 | 166 | 165 | 164 | 165 |
| Pressure (atmospheres) | 10.3 | 14.4 | 10.3 | 12.4 | 13.4 | 14.4 | 14.4 | 13.4 |
| pH of reaction mixture | 12.0 | 8.8 | 7.0 | 5.6 | 2.7 | 2.6 | 2.8 | 4.1 |
| Yield of glycol (percent) | 2 | 8 | 36 | 41 | 54 | 47 | 56 | 38 |
| Yield vinyl chloride (percent) | ---- | 67.5 | 39.5 | 11.7 | 9.9 | 2.8 | 12.6 | 16.8 |

The process of the invention is applicable broadly to the hydrolysis of hydrolyzable halogenated organic compounds to hydroxy compounds containing fewer halogen atoms. It may, for example, with suitable modification within the scope of the invention, be employed to effect the hydrolysis of monohalogenated hydrocarbons, which may or may not be further substituted, to the corresponding monohydrate alcohols. For example, ethyl chloride, ethyl bromide, propyl chloride, the butyl monohalides and the like may be hydrolyzed to the corresponding monohydric alcohols. The process may be of particular value when it is desired to hydrolyze unsaturated monohalides to the corresponding unsaturated alcohols, since in the hydrolysis of such compounds accurate control of the pH of the reaction mixture is, in many cases, essential if rearrangement, polymerization, dehydration, and the like undesired side reactions are to be avoided. The principles of the invention are thus applicable to the hydrolysis of allyl chloride and allyl bromide to allyl alcohol, to the hydrolysis of methallyl chloride to methallyl alcohol, to the hydrolysis of crotyl chloride and crotyl bromide to crotyl alcohol and to the like hydrolysis of the higher unsaturated halides to unsaturated alcohols or rearrangement products thereof. In some cases, vinyl type halides may be hydrolyzed in accordance with the process and converted to valuable carbonylic compounds. For example, vinyl chloride or vinyl bromide may be converted to acetaldehyde. The process may also be applied to the hydrolysis of halogenated acids to hydroxy acids, to the halogenation of halogenated aldehydes and ketones to aldols and ketols, and the like. In fact, the principles of the invention are applicable to any reaction effected in an aqueous medium wherein an acidic compound such as a hydrogen halide is liberated during the reaction, and wherein it is desired to control or maintain a definite pH in the aqueous reaction medium.

The invention provides a process particularly adapted to the technical scale conversion of olefine polyhalides, olefine halohydrins, glycerine halohydrins and their homologues, analogues and suitable substitution products to the corresponding polyhydric alcohols. For example, ethylene dichloride may be hydrolyzed to ethylene glycol, propylene dichloride to propylene glycol, the butylene dihalides to the butylene glycols, the amylene dihalides to the amylene glycols, etc. The ethylene halohydrins may be hydrolyzed to ethylene glycol, the propylene halohydrins to propylene glycols, the butylene halohydrins to butylene glycols, the amylene halohydrins to amylene glycols, etc. The process may also be executed to convert the olefine halohydrins to the corresponding olefine oxides. For example, ethylene chlorhydrin may be treated in accordance with the process of the invention under such conditions of temperature, pressure and contact time, and while maintaining the appropriate pH in the reaction mixture that it is converted to ethylene oxide.

As previously pointed out and illustrated in the examples, the process of the invention provides a practical and economical process for the conversion of polyhalogenated organic compounds, particularly the olefine dihalides and related compounds, to valuable vinyl type halides. For example, ethylene dichloride may be treated in accordance with the process of the invention and converted in good yield to vinyl chloride. In like manner the higher olefine dihalides may be converted to the corresponding vinyl type halides.

Glycerine mono- and dihalohydrins may be treated in accordance with the principles of the invention and hydrolyzed to glycerine. The compounds such as glycerine monobromhydrin, glycerine dibromhydrin, glycerine monochlorhydrin, glycerine dichlorhydrin, alpha-methyl glycerine monochlorhydrin, alpha-methyl glycerine dichlorhydrin, alpha, alpha'-methyl glycerine monochlorhydrin, alpha-ethyl glycerine monochlorhydrin, beta-methyl glycerine monochlorhydrin, beta-ethyl glycerine monochlorhydrin and the like and their homologues may be hydrolyzed in a practical and economical manner to the corresponding glycerols. In like manner, the polyhalogenated organic compounds containing single halogen atoms linked to vicinal carbon atoms may be hydrolyzed to the corresponding polyhydric alcohols. For example, 1,2,3-trichlorpropane may be hydrolyzed to glycerine, 1,2,3-trichlorbutane may be hydrolyzed to alpha-methyl glycerine, 2-methyl-1,2,3-trichlorpropane may be hydrolyzed to beta-methyl glycerine in accordance with the process. It will be apparent to those skilled in the art that the invention is also applicable to the hydrolysis of the homologues, analogues and suitable substitution products of the herein mentioned halogenated organic compounds.

While we have described our invention in a detailed manner and illustrated suitable modes of executing the process thereof, it is to be understood that modifications may be made and that no limitations other than those imposed by the scope of the appended claims are intended.

We claim as our invention:

1. A continuous process for the production of ethylene glycol by effecting the hydrolysis of ethylene dichloride by reaction with an aqueous solution of disodium phosphate at a temperature of from about 175° C. to 220° C. and under a pressure of from about 10 to about 25 atmospheres which comprises continuously feeding the ethylene dichloride and an aqueous disodium phosphate solution of about one molal concentration into the reaction zone at such relative rates that the pH of the aqueous reaction mixture is maintained at about 3, continuously withdrawing a proportionate amount of the reacted mixture from the reaction zone, adding to the withdrawn portion of the reaction mixture, while it is at a temperature of about 90° C. to about 110° C., a sufficient amount of sodium carbonate to convert the monosodium phosphate and phosphoric acid therein to disodium phosphate, cooling the thus treated mixture to crystallize the disodium phosphate, separating the crystallized disodium phosphate from the liquid, and treating the liquid containing ethylene glycol, salt and water to recover the glycol therefrom.

2. A continuous process for the production of ethylene glycol by effecting the hydrolysis of ethylene dichloride by reaction with an aqueous solution of disodium phosphate at a temperature greater than about 140° C. which comprises continuously feeding the ethylene dichloride and the aqueous disodium phosphate solution into the reaction zone at such relative rates that the pH of the aqueous reaction mixture therein is maintained at from about 2 to about 5, continuously withdrawing a proportionate amount of the reacted mixture from the reaction zone, treating the withdrawn portion of the reaction mixture with a sufficient amount of a basic sodium compound to convert the monosodium phosphate and phosphoric acid therein to disodium phosphate, and recovering the disodium phosphate and glycol from the thus treated reaction mixture.

3. A continuous process for the production of a glycol by effecting the hydrolysis of an olefine dihalide by reaction with an aqueous solution of disodium phosphate at a temperature greater than about 140° C. which comprises continuously feeding the olefine dihalide and the aqueous disodium phosphate solution into the reaction zone at such relative rates that the pH of the aqueous reaction mixture is maintained at from about 2 to about 5, continuously withdrawing a proportionate amount of the reacted mixture from the reaction zone, and treating the withdrawn portion to recover the glycol therefrom.

4. A process for the production of ethylene glycol which comprises reacting ethylene dichloride with an aqueous solution of disodium phosphate at a temperature of from about 175° C. to about 220° C. and under a pressure of from about 10 to about 25 atmospheres, the disodium phosphate being present in the reaction mixture in such an amount relative to the ethylene dichloride undergoing hydrolysis that the pH of the aqueous reaction mixture is maintained at from about 2 to about 5.

5. A process for the production of ethylene glycol which comprises reacting ethylene dichloride with an aqueous solution of a sodium phosphate at a temperature greater than about 140° C., the sodium phosphate being present in the reaction mixture in such an amount relative to the ethylene dichloride undergoing hydrolysis that the pH of the aqueous reaction mixture is maintained at from about 2 to about 5 during the reaction.

6. A process for the production of vinyl chloride which comprises treating ethylene dichloride with an aqueous solution of a sodium phosphate under a superatmospheric pressure and at a temperature greater than about 140° C., a sodium phosphate being present in the reaction mixture in such an amount relative to the amount of the ethylene dichloride undergoing reaction that the pH of the aqueous reaction mixture is maintained in the range of from about 6 to about 12 during the reaction.

7. A process for the production of a vinyl halide which comprises treating an ethylene dihalide with an aqueous solution of a sodium phosphate at an elevated temperature and under a superatmospheric pressure while maintaining the pH of the aqueous reaction mixture at a value greater than about 6 by regulating the amount of the sodium phosphate relative to the ethylene dihalide undergoing reaction in the aqueous reaction mixture.

8. A process for the production of ethylene glycol which comprises reacting an ethylene dihalide with an aqueous solution of a sodium phosphate under a superatmospheric pressure and at a temperature greater than about 140° C., the sodium phosphate being present in such an amount relative to the amount of the ethylene dihalide undergoing hydrolysis that the pH of the aqueous reaction mixture is maintained in the range of from 1 to 6 during the reaction.

9. A process for the hydrolysis of an olefine dihalide to the corresponding glycol which comprises reacting an olefine dihalide with an aqueous solution of disodium phosphate at a temperature greater than about 125° C., the disodium phosphate being present in such an amount relative to the amount of the olefine dihalide undergoing hydrolysis that the pH of the aqueous reaction mixture is maintained in the range of from 1 to 6 during the reaction.

10. A process for the production of a polyhydric alcohol which comprises reacting a halogenated organic compound of the class consisting of the olefine polyhalides, olefine halohydrins and glycerol halohydrins with an aqueous solution of disodium phosphate at a temperature greater than about 125° C., the disodium phosphate being present in such an amount relative to the amount of the halogenated organic compound undergoing hydrolysis that the pH of the aqueous reaction mixture is maintained in the range of from 1 to 6 during the reaction.

11. In a process for the production of a glycol from the corresponding olefine dihalide by reacting the olefine dihalide with water under conditions at which hydrolysis occurs, the step which comprises effecting the reaction in the presence of such an amount of a sodium phosphate that the pH of the reaction mixture is maintained in the range of from 1 to 6 during the reaction.

12. In a process for the production of a polyhydric alcohol by reacting a halogenated organic compound of the class consisting of the olefine polyhalides, olefine halohydrins and glycerol halohydrins with water under conditions at which hydrolysis occurs and a hydrogen halide is liberated, the step which comprises effecting the reaction in the presence of such an amount of disodium phosphate that the pH of the aqueous reaction mixture is maintained in the range of from 1 to 6 during the reaction.

13. In a process for the production of a polyhydric alcohol by reacting a halogenated organic compound of the class consisting of the olefine polyhalides, olefine halohydrins and glycerol halohydrins with water under conditions at which hydrolysis occurs and a hydrogen halide is liberated, the step which comprises effecting the reaction in the presence of such an amount of a buffering agent selected from the group consisting of the alkali metal phosphates and ammonium phosphates that the pH of the aqueous reaction mixture is maintained in the range of from 1 to 6 during the reaction.

14. In a process for the hydrolysis of a hydrolyzable halogenated organic compound to an organic hydroxy-compound by reaction with water in the presence of a basic agent under conditions at which hydrolysis occurs and a hydrogen halide is liberated, the step which comprises effecting the hydrolysis in the presence of such an amount of a sodium phosphate that the pH of the aqueous hydrolysis mixture is maintained in the range of from 1 to 6 during the reaction.

15. In a process for the hydrolysis of a hydrolyzable halogenated organic compound to an organic hydroxy-compound by reaction with water in the presence of a basic agent under conditions at which hydrolysis occurs and a hydrogen halide is liberated, the step which comprises effecting the hydrolysis in the presence of such an amount of an alkali metal phosphate that the pH of the aqueous hydrolysis mixture is maintained in the range of from 1 to 6 during the reaction.

16. In a process for the hydrolysis of a hydrolyzable halogenated organic compound to an organic hydroxy-compound by reaction with water in the presence of a basic agent under conditions at which hydrolysis occurs and a hydrogen halide is liberated, the step which comprises effecting the hydrolysis in the presence of such an amount of a buffering agent which is capable of neutralizing a hydrogen halide but incapable of reacting therewith to liberate a permanent acidic gas that the pH of the aqueous hydrolysis mixture is maintained in the range of from 1 to 6 during the reaction.

17. In a process for the conversion of a hydrolyzable halogenated organic compound to a valuable organic product containing fewer halogen atoms by treating the hydrolyzable halogenated organic compound with water in the presence of a basic agent under conditions at which the reaction occurs and a hydrogen halide is liberated, the step which comprises effecting the reaction in the presence of such an amount of a sodium phosphate that the pH of the aqueous reaction mixture is maintained substantially constant at a predetermined optimum value during the reaction.

18. In a process for the conversion of a hydrolyzable halogenated organic compound to a valuable organic product containing fewer halogen atoms by treating the hydrolyzable halogenated organic compound with water in the presence of a basic agent under conditions at which the reaction occurs and a hydrogen halide is liberated, the step which comprises effecting the reaction in the presence of such an amount of a buffering agent selected from the group consisting of the alkali metal phosphates and the ammonium phosphates that the pH of the aqueous reaction medium is maintained substantially constant at a predetermined optimum value during the reaction.

19. In a process for the conversion of a hydrolyzable halogenated organic compound to a valuable organic product containing fewer halogen atoms by treating the hydrolyzable halogenated organic compound with water in the presence of a basic agent under conditions at which the reaction occurs and a hydrogen halide is liberated, the step which comprises effecting the reaction in the presence of such an amount of a buffering agent of the group consisting of the alkaline phosphates and alkaline borates that the pH of the aqueous reaction medium is maintained substantially constant at a predetermined optimum value during the reaction.

20. In a process for the conversion of a hydrolyzable halogenated organic compound to a valuable organic product containing fewer halogen atoms by treating the hydrolyzable halogenated organic compound with water in the presence of a basic agent under conditions at which the reaction occurs and a hydrogen halide is liberated, the step which comprises effecting the reaction in the presence of such an amount of a buffering agent which is capable of neutralizing a hydrogen halide but incapable of reacting therewith to liberate a permanent acidic gas that the pH of the aqueous reaction medium is maintained substantially constant at a predetermined optimum value during the reaction.

JAN D. RUYS.
HORACE R. McCOMBIE.